US007840467B2

(12) United States Patent
Breeden

(10) Patent No.: US 7,840,467 B2
(45) Date of Patent: Nov. 23, 2010

(54) COVARIANCE OF RETAIL LOAN PRODUCT PERFORMANCES

(75) Inventor: Joseph L. Breeden, Santa Fe, NM (US)

(73) Assignee: Strategic Analytics, Inc., Santa Fe, NM (US)

( * ) Notice: Subject to any disclaimer, the term of this patent is extended or adjusted under 35 U.S.C. 154(b) by 258 days.

(21) Appl. No.: 11/546,153

(22) Filed: Oct. 11, 2006

(65) Prior Publication Data

US 2008/0091621 A1     Apr. 17, 2008

(51) Int. Cl.
    *G06Q 40/00*     (2006.01)
(52) U.S. Cl. .................................................. 705/36 R
(58) Field of Classification Search ................ 705/36 R
See application file for complete search history.

(56) References Cited

U.S. PATENT DOCUMENTS

| 2003/0093352 A1 | 5/2003 | Muralidhar et al. |
| 2003/0225659 A1 | 12/2003 | Breeden et al. |
| 2006/0010032 A1 | 1/2006 | Eicher et al. |

OTHER PUBLICATIONS

Gary G.J. Lee, "Contemporary and Long-Run Correlations: A Covariance Component Model and Studies on the S&P 500 Cash and Futures Markets," The Journal of Futures Markets, Dec. 1999, vol. 19, No. 8, pp. 877-893.*
David K. Musto, Nicholas S. Souleles, "A portfolio view of consumer credit," Journal of Monetary Economics, Jan. 2006, vol. 53, Iss. 1, pp. 59-84.*
Breeden, Joseph, "Portfolio Forecasting Tools: What You Need to Know," The RMA Journal, Oct. 2003, vol. 86, No. 2, pp. 78-87.*
Kuykendall, Lavonne, "Portfolio Trend Readers Get Wider Following," American Banker, New York, Apr. 1, 2003, vol. 168, Iss. 62, p. 7.*
Tribue, Edmund, "Beyond credit scoring: decompositional analytics and the culture of analysis," Bank News, Apr. 2006, vol. 106, Iss. 4, p. 18.*
"Strategic Analytics Installs LookAhead(TM) Software at Household International," PR Newswire, New York, Sep. 24, 2002, p. 1.*
Sanders, Robert, "A Forecasting Method That Thrives on Change," American Banker, New York, Feb. 18, 2005, vol. 170, Iss. 34, p. 11.*
Dev, Ashish, "The Correlation Debate," Risk, London, Oct. 2006, vol. 19, Iss. 10, p. 66.*
U.S. Appl. No. 09/781,310, filed Feb. 13, 2001, Breeden.
Bank for International Settlements, "Basel Committee on Banking Supervision" International Convergence of Capital Measurement and Capital Standards, pp. i-272.
Jobson et al., "Putting Markowitz Theory to Work", Journal of Portfolio Management, pp. 70-74.
Markowitz, "Portfolio Selection", Journal of Finance, vol. 7, Issue 1, pp. 77-91 (1952).

* cited by examiner

*Primary Examiner*—Charles R Kyle
*Assistant Examiner*—David L Wood
(74) *Attorney, Agent, or Firm*—John S. Paniaguas; Katten Muchin Rosenman LLP

(57) ABSTRACT

The present invention relates to a method that allows managers of retail portfolios to compute performance time series that have been cleaned of marketing impacts, lifecycles, management actions, and seasonality, leaving only the performance changes due to the environment. These normalized series can be used to compute the necessary covariance matrices for portfolio optimization or computing portfolio-level economic capital. The invention applies to any retail product or segment where vintage-level performance time series are being stored.

12 Claims, 5 Drawing Sheets

US 7,840,467 B2

COVARIANCE OF RETAIL LOAN PRODUCT PERFORMANCES

BACKGROUND OF THE INVENTION

1. Field of the Invention

The present invention relates to a method for computing the covariance between time series of losses, profitability, or other appropriate metrics on various product segments within a retail portfolio for use in portfolio optimization and economic capital calculation.

2. Description of the Prior Art

Portfolio optimization and economic capital calculation are key strategic issues for retail portfolio managers. Portfolio optimization refers to creating an optimal blend of products and services across different consumer segments. Computing economic capital seeks to determine how much capital a bank needs to hold in order to protect against an economic downturn in which a large number of loans default in the same time period. If the calculations for either the portfolio optimization or the economic capital calculation are not correct, the bank risks: booking the wrong proportion of loans; not correctly pricing for the risks assumed; or being inefficient in their allocation of capital.

Portfolio optimization and economic capital calculation are known to be treated together because the considerations for both are similar. More particularly, for portfolio optimization, the expected profit for each product segment; the profit volatility within each segment; and the correlations between segments, must be accurately predicted. For economic capital calculation, the expected losses for each product segment; the loss volatility within each segment; and the correlation of losses between segments must be accurately predicted.

Harry Markowitz initiated modern portfolio theory with his landmark paper in 1952; "Portfolio Selection", H. M. Markowitz, *Journal of Finance*, Vol. 7, Issue 1, pages 77-91, 1952, hereby incorporated by reference. The question presented in the paper was essentially, "How is the optimal investment blend chosen across a set of different opportunities?" Mr. Markowitz theorized that the optimal portfolio is one which maximizes return while simultaneously minimizing the volatility of returns.

The ratio of return over volatility is referred to as the Sharpe Ratio. For a set of investment opportunities, $$S_i = \frac{r_i - r_f}{\sigma_i}$$

where $S_i$ is the Sharpe Ratio for the $i^{th}$ investment opportunity, $r_i$ is the expected return, $\sigma_i$ is the expected volatility, and $r_f$ is the risk-free rate of return, such as from a US government bond. In retail lending, return is the expected profitability for the loan or pool of loans and the volatility is the uncertainty in obtaining the anticipated margin. The portfolio's hurdle rate should be substituted for the risk-free rate. Hurdle rates are described in detail in: Principles of Corporate Finance, Fifth Edition", by Richard A. Brealey and Stewart C. Myers, McGraw-Hill, 1996, hereby incorporated by reference.

Markowitz also recognized the importance of the correlation between investment opportunities in his solution. For example, in retail lending, Markowitz's theory would say that it would not be sufficient to determine that five (5) mid-tier credit card segments all had the highest profit-volatility ratio because those segments are likely to move in unison relative to the economy. According to Markowitz's theory, placing the entire portfolio's growth in those five segments would thus not be optimal because it does not confer any diversification benefit.

The idea behind a diversification benefit is that the less correlation there is between investments, the lower the overall volatility of the portfolio. For example, considering two products that provide equal returns but are highly anti-correlated, the best answer is to invest in both equally. The average return would be unchanged, but the net volatility would be much lower.

Markowitz provided a simple solution to this optimization problem. Subsequent work incorporated the notion of business constraints so that more realistic solutions could be derived. Many commercially available software packages are available to compute the ideal portfolio blend using Markowitz's theory, as long as the user provides the expected profit and volatility for each instrument, and covariance between instruments. Examples of such commercially available software packages are "S+" and "SAS".

Unfortunately, many portfolio optimization implementations, such as those mentioned above, use historical averages for the rate of return. Taking such a backward-looking view of the portfolio has led to some of the major portfolio failures of the last decade. If no reliable forecasts are available, portfolio optimization should not be attempted and capital calculations will be badly skewed. Because of the difficulties in computing expected returns and expected volatility, modern portfolio theory, as promulgated by Markowitz, has often proven unreliable and even dangerous when applied to market-traded instruments.

However, retail portfolios are predictable if the unique dynamics of those portfolios are taken into consideration, as discussed in co-pending commonly owned U.S. patent application Ser. No. 09/781,310, filed on Feb. 13, 2001, entitled "Vintage Maturation Analytics for Predicting Cash Flow for Customer Commodities and their Responses to Economic, Competitive, or Management Changes" and U.S. patent application Ser. No. 10/359,895, filed on Feb. 7, 2003 and published as US Patent Application Publication No. US 2003/0225659 A1 on Dec. 4, 2003, entitled "Retail Lending Risk Related Scenario Generation", hereby incorporated by reference. The technology disclosed therein to create accurate forecasts of profit (or loss) and profit volatility (or loss volatility) is called Dual-time Dynamics (DtD).

Briefly, DtD decomposes historical data into tenure-based, time-based, and vintage-based components. FIG. 1 shows a top down view of retail portfolio data. Each month a new vintage is booked. A vintage is a group of accounts all booked in the same period of time. Each of the diagonal lines in FIG. 1 represents the aging of a vintage in both calendar date and months-on-books (tenure). The performance of the vintage in profitability, loss rate, or any other metric, would be represented by a line coming out of the page. DtD analyzes all of the vintages simultaneously according to the following model: $r(v,a,t)=H(f_m(a),f_g(t),f_q(v))$, where r is the rate being modeled, v is the vintage, a is the age (months-on-books) of the vintage, t is the calendar date, $f_m(a)$ is the maturation curve measured either parametrically or non-parametrically as a function of months-on-books, $f_g(t)$ is the exogenous curve measured non-parametrically as a function of calendar date, $f_q(v)$ is the vintage quality curve measured as a non-parametric function of vintage, and H is the composition function of the curves to create the final answer. If H is additive, then $r(v,a,t)=f_m(a)+f_g(t)+f_q(v)$, or when H is multiplicative then $r(v,a,t)=f_m(a) \cdot f_g(t) \cdot f_q(v)$.

Nonlinear functions are also frequently used for H. DtD takes the vintage performance data as in FIG. 1, assumes a form for H, and then estimates the functions $f_m(a)$, $f_g(t)$, and $f_q(v)$ by solving the inverse problem. The method of generalized additive models, for example, as described in "Generalized Additive Models"; by T. J. Hastie and R. J. Tibshirani, published by Chapman and Hall, New York, 1990, uses a similar method of solution, except with purely orthogonal functions and an additive H. The maturation curve captures the product lifecycle cleaned of noise from the economy or marketing plans. The exogenous curve measures primarily the seasonality and macroeconomic impacts. Vintage quality measures the intrinsic risk of the vintage cleaned of variations in the economy. Credit scores are reasonable predictors of vintage quality.

The exogenous curve is further analyzed using standard econometric methods to extract seasonality and macroeconomic impacts (called the trend). The full decomposition process is shown in FIG. 2 and described in detail in the patent applications mentioned above.

Once the three components, i.e. tenure-based, time-based and vintage-based components, have been derived, forecasts are created by inserting a scenario for the future of the macroeconomic impacts on the exogenous curve. This is combined with the seasonality, vintage quality, and maturation curve to create a forecast for each vintage. For future vintages, a scenario for their quality must be included. The shaded region of FIG. 1 represents the area to be forecasted and the scenario elements required to create the rate forecasts. FIG. 3 illustrates how those forecasts are combined with scenarios for the volume of new bookings and other rate forecasts to create the final portfolio forecast. When modeling in the context of economic capital, the key rates are usually PD (probability of default), EAD (exposure at default), and LGD (loss given default), as described in detail in the Basel II literature, for example, "International Convergence of Capital Measurement and Capital Standards", by the Basel Committee on Banking Supervision, Bank for International Settlements Press & Communications, CH-4002, Switzerland, Copyright 2005, pages 1-284. To model profitability, additional variables for revenue generation and attrition are usually included, for example, as defined in detail in Principles of Corporate Finance, Fifth Edition", by Richard A. Brealey and Stewart C. Myers, McGraw-Hill, 1996, hereby incorporated by reference.

Expected Volatility

Co-pending, commonly owned U.S. patent application Ser. No. 10/359,895, filed on Feb. 7, 2003 and published as US Patent Application Publication No. US 2003/0225659 A1 on Dec. 4, 2003, entitled "Retail Lending Risk Related Scenario Generation"; shows that the outputs of DtD can be combined with a Monte Carlo scenario generator to compute the expected volatility for the portfolio. FIG. 4 shows the process whereby the previously measured exogenous trend is analyzed to create a predictive ARIMA-style model, for example, as described in "Applied Econometric Time Series, 2nd Ed.", by Walter Enders, Wiley Series in Probability and Statistics, 2004. hereby incorporated by reference and a distribution of model residuals. From this, scenarios for $f_g(t)$ are created as: $\tilde{f}_g(t) = y(f_g(t-1)) + \epsilon_t$, where y is an econometric model like ARMA or ARIMA, $f_g(t-1)$ is the function of the exogenous trend for all times up to t−1, and $\epsilon_t$ is the noise term taken from the econometric model residuals. These scenarios are fed through the forecasting procedure shown in FIG. 3 to produce a distribution of future profit or loss. The distribution can be measured at one-standard deviation for profit volatility or at some higher level (99.9% in the Basel II specification) to measure economic capital.

Co-pending commonly owned U.S. patent application Ser. No. 09/781,310, filed on Feb. 13, 2001, entitled "Vintage Maturation Analytics for Predicting Cash Flow for Customer Commodities and their Responses to Economic, Competitive, or Management Changes" and U.S. patent application Ser. No. 10/359,895, filed on Feb. 7, 2003 and published as US Patent Application Publication No. US 2003/0225659 A1 on Dec. 4, 2003, entitled "Retail Lending Risk Related Scenario Generation", hereby incorporated by reference, demonstrate that the processes represented in FIGS. 1-4 are sufficient and accurate for forecasting and computing expected volatility. However, for portfolio optimization and diversified economic capital, the covariance must be measured. Covariance relates to the expected correlation between products. Measuring covariance is not a simple process, because the performance data is contaminated with marketing plans and product lifecycle impacts which cannot be expected to recur in the future.

For example, consider a scenario in which new products are launched in two different areas in the same quarter, say a prime auto product and a sub-prime mortgage product. Because of lifecycle effects present in both products, overall loss rates will rise steadily for the first several years regardless of what happens in the macroeconomic environment. Computing the correlation coefficient between the performance time series of two products would lead to an interpretation that they are very highly correlated. However, from this kind of management-induced correlation, is it reasonable to expect that prime auto will be highly correlated to sub-prime mortgage in the future?

There is a further complication of deciding which time series to correlate, since many different variables have an impact on the total portfolio performance. Thus, there is a need for accurately predicting the correlation between different product segments in order for use in portfolio optimization and economic capital calculation.

SUMMARY OF THE INVENTION

The present invention relates to a method for computing the covariance between product segments for profitability, losses, or any other performance metric in a process capable of removing or cleaning away the impacts of marketing plans, product lifecycles, and management actions so that true covariances due to product responses to macroeconomic cycles is revealed. In accordance with one aspect of the present invention, a decomposition technique, for example, Dual-time Dynamics, is used to quantify the maturation, vintage quality, seasonality, and exogenous trend for a set of key rates that are used to forecast the desired portfolio metric. Because decomposition is required, the data must be available as vintage-level time series data. In accordance with another aspect of the present invention, a scenario is created where the marketing plan is held at a steady level and mix, seasonality is erased, and the macroeconomic scenario is a replay of the historical exogenous trend. This forecast will typically be 5 to 10 years in length. By creating a steady-state scenario for marketing and lefting the portfolio mature to a steady average age, the only remaining variations in the performance metric will be due the replayed macroeconomic environment as captured in the exogenous trend. At this point, the performance metric, combining the macroeconomic impacts of all the variables relevant to that metric, is correlated against the same period for any other product segments of interest, or even non-retail portfolios that do not employ this technique. As such, relatively accurate predictions of the expected future correlation between different products in order to more accurately determine the portfolio optimization and economic capital calculation.

DESCRIPTION OF THE DRAWING

These and other advantages of the present invention will be readily understood with reference to the following specification and attached drawing wherein.

DETAILED DESCRIPTION

The present invention relates to a method for computing covariances between product segments of retail portfolios with sufficient accuracy to support useful portfolio optimization and the calculation of economic capital. The present invention uses the processes shown in FIGS. 2 and 3 with a specific scenario in order to create the cleaned or steady state performance metric. As mentioned above, these processes are described in detail in co-pending commonly owned U.S. patent application Ser. No. 09/781,310, filed on Feb. 13, 2001, entitled "Vintage Maturation Analytics for Predicting Cash Flow for Customer Commodities and their Responses to Economic, Competitive, or Management Changes" and U.S. patent application Ser. No. 10/359,895, filed on Feb. 7, 2003 and published as US Patent Application Publication No. US 2003/0225659 A1 on Dec. 4, 2003, entitled "Retail Lending Risk Related Scenario Generation, hereby incorporated by reference.

Figure 1:
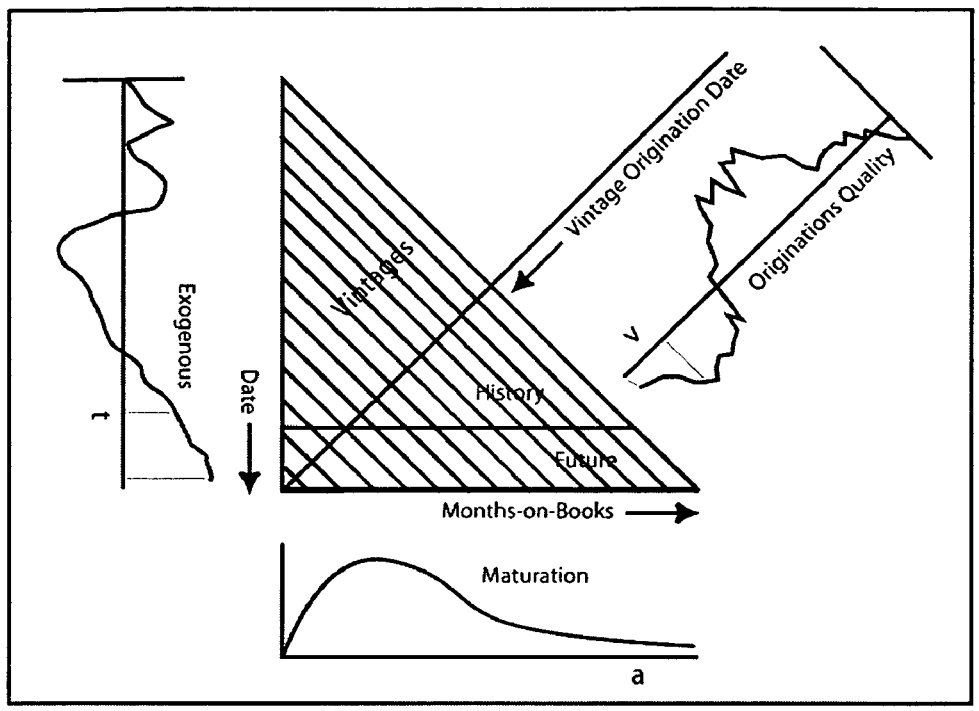
FIG. 1 is a diagram showing how decomposition algorithms can be used to separate vintage performance data into the constituent parts, where the diagonal lines represent vintages aging in both calendar date and month-on-books (tenure) and performance would be shown out of the page. And where decomposition projects the data onto the axes: a maturation function of months-on-books (a), an exogenous function of calendar date (t), and a quality function of vintage (v). The shaded region is where the forecast is being created using scenarios for the shaded regions of the constituent curves.
Figure 2:
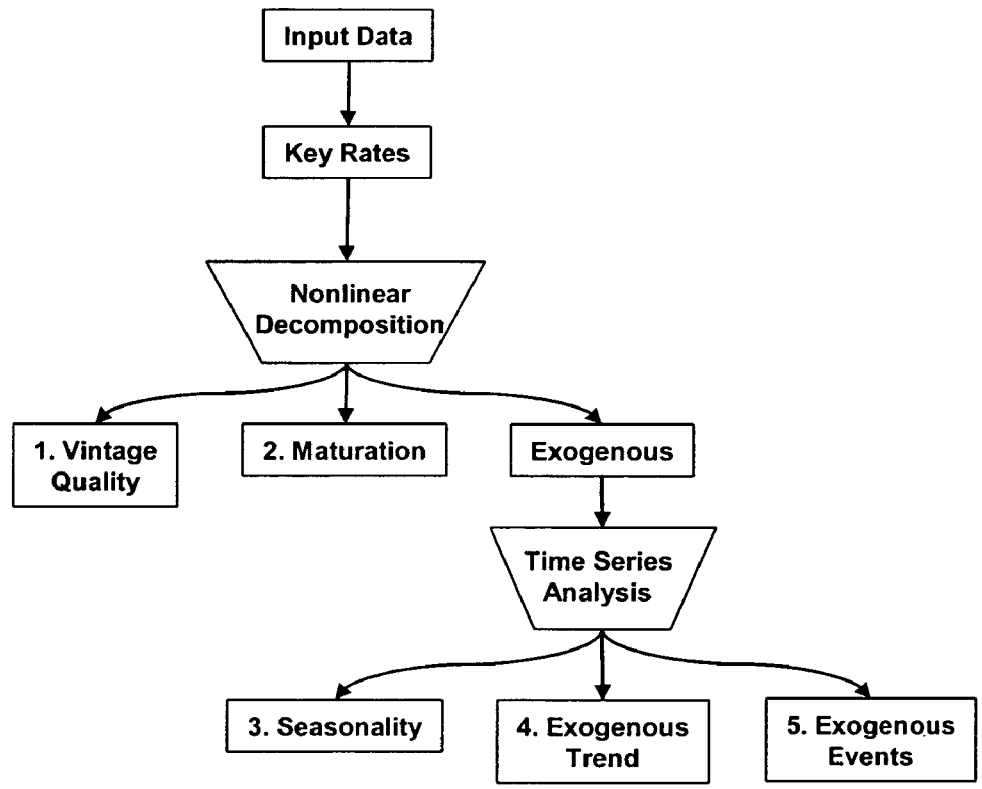
FIG. 2 is a diagram showing the decomposition process in which raw data is converted to a set of key rates and each rate is decomposed into maturation, exogenous, and vintage quality. The exogenous curve is further separated using standard econometric modeling into seasonality, trend, and events.

Almost all performance metrics of interest are modeled via a set of Key Rates. These Key Rates are derived from the vintage-level performance data as shown in FIG. 2. Each of the Key Rates is Decomposed into Maturation, Exogenous, and Vintage Quality. The Exogenous curve is further decomposed via the process described in FIG. 1 into Seasonality, Exogenous Trend, and Exogenous Events.

Figure 3:
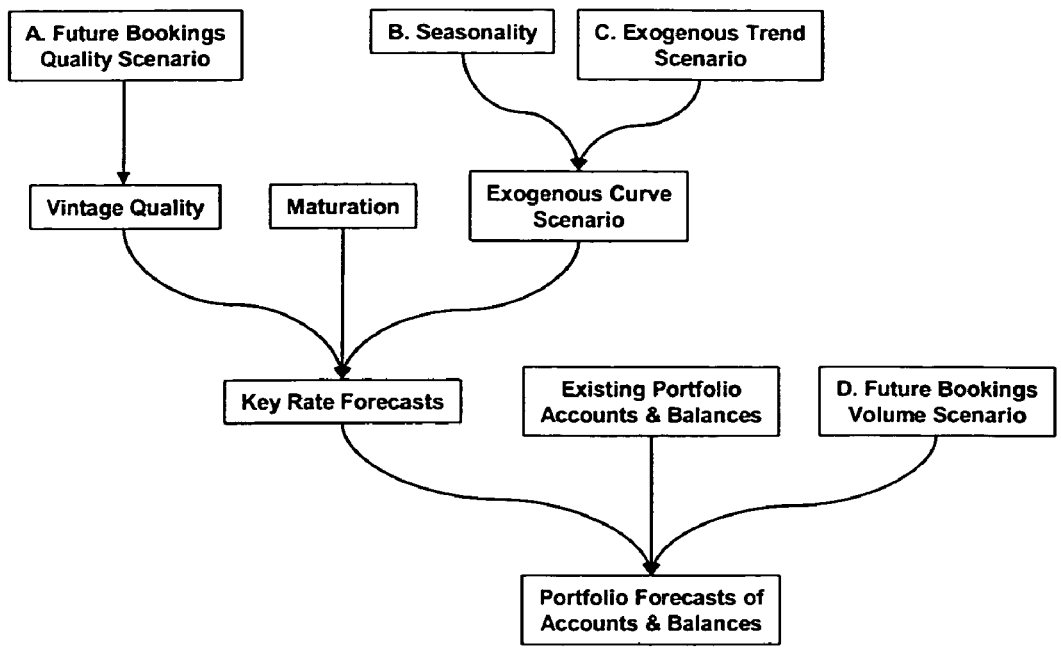
FIG. 3 is a diagram that illustrates by combining the components from the decomposition with scenarios (the lettered items), a forecast is created. A scenario for the quality of future bookings (A) is needed to complete the vintage quality function. A scenario for seasonality (B) and the exogenous trend (C) which is driven mostly by the economy are combined to create the exogenous scenario. Combining the quality and exogenous scenarios with the known maturation curves produces a forecast of the key rates. The key rate forecasts are combined with the portfolio's inventory of accounts and balances and a scenario for the volume and mix of future bookings to produce a forecast of the protfolio's future accounts and balances.

The process shown in FIG. 3 is used to create a forecast for the portfolio metric of interest. The forecast must be as long as the historical data, plus a relaxation period. The relaxation period is required to let the portfolio reach a steady-state relative to previous marketing plans. To reach steady-state, the portfolio must be dominated by bookings which occur in the forecast. Therefore, an effective metric for picking the relaxation time is to look at the time required for the average vintage to drop 50% from its peak monthly level. For retail loan portfolios, this is usually about three years.

The scenario for the forecast is designed so that only the environmental piece is allowed to create volatility in the performance metric. The New Bookings Volume scenario (FIG. 3, Item D) is set to an average of the previous year, both in volume and in product segment mix. The New Bookings Quality scenario (FIG. 3, Item A) is set to an average of the quality of the bookings for the previous two years, because of uncertainties in recent estimates. The averaging period for Items A and D can be changed as needed to get the best results for the portfolio. The Seasonality (FIG. 3, Item B) is set to zero, so that the correlation calculations are not dependent on seasonal correlations. The Exogenous Trend scenario (FIG. 3, Item C) is the most important. Through the relaxation period, the exogenous trend is set to be a flat line, either from the last historical point or using some historical average. At the end of the relaxation period, the exogenous trend is set to an exact copy of the historical exogenous trend.

The result of these scenario choices is to create a stable portfolio mix representing recent booking patterns and make that portfolio relive the macroeconomic environment experienced in the past. These scenario changes are made for each of the Key Rates. Those key rate forecasts are combined with the existing inventory to create a portfolio forecast for the desired portfolio performance metric, such as profitability or loss rate. The period from the end of the relaxation period to the end of the forecast is called the Estimation Period. The portfolio performance in the estimation period is shifted backward in time to line up with the historical data used to create the exogenous trend scenario. This shifted performance forecast represents what would have happened in the portfolio without the impacts of marketing plans, account management, or seasonality and is referred to as the Synthetic Performance Index.

By computing a Synthetic Performance Index for each of the product segments in question, the proper covariance matrix can be computed using standard statistical methods. If non-retail products are to be included, they will need to have an appropriate performance metric included, in which case they can be included in the computation of the covariance matrix.

Once the exported performance is known via a forecast and the expected volatility is measured, for example, as discussed above, the covariance can be computed in accordance with the present invention. These calculations can be combined via Markowitz Portfolio Theory or equivalent methods to compute the optimal product mix for the portfolio.

Correlations in Aggregating Economic Capital

Figure 5:
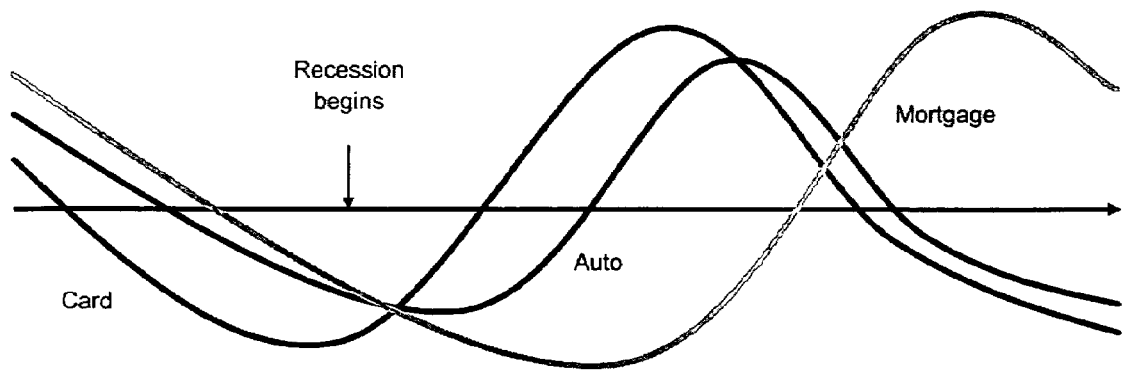
FIG. 5 is an exemplary time line diagram illustrating the overall economic capital required for three distinct products: credit card, automobile loans and mortgages.

A requirement for measuring the covariance matrix arises when computing the overall economic capital required for a blend of business segments, for example as shown in FIG. 5. The economic capital for each segment is initially computed separately. The simplest answer is simply to add all the estimates together: $C_{Bank} = C_{Card} + C_{Auto} + C_{Mortgage} + \ldots$ However, institutions with portfolios spread across many products naturally expect that those products will not all suffer high losses at exactly the same point in time. Studies of retail portfolios have shown significant time lags between card, auto, and mortgage in response to the same macroeconomic changes. Even more dramatic differences occur when comparing retail to corporate loans, bonds, stock portfolios, insurance, etc. Consequently, most institutions believe that they should receive a diversification benefit, which implies that $C_{Bank} \leq C_{Card} + C_{Auto} + C_{Mortgage} + \ldots$ Further, if a portfolio could demonstrate that all their portfolios were uncorrelated, the total capital would simply be $$C_{Bank}^2 = C_{Card}^2 + C_{Auto}^2 + C_{Mortgage}^2 + \ldots$$

Theoretically, portfolios which are anti-correlated to other portfolios could be determined, thereby providing an even lower estimate. Considering retail in isolation, few anti-correlations are expected, because consumers tend to respond to recessions similarly across retail loan products.

Some financial institutions estimate that this diversification benefit should be as large as a 20% to 30% reduction in capital, based upon their initial estimates on traded instruments where correlations are simple to compute.

To measure the diversification benefit, more than just the exogenous curve for the probability of default (PD) must be considered. Just considering the Net Default Loss Rate as computed under Basel II, for example, as referenced above, various factors must be considered, such as, exogenous curves for the account default rate, exposure at default (EAD), and loss given default (LGD). A more sophisticated model would also incorporate attrition rates, delinquency rates, and interdependencies between these variables.

The solution is to create a synthetic index representing the aggregate impact from the macroeconomic environment on default net loss or return, depending on the problem at hand. A synthetic index is used to represent an idealized portfolio cleaned of the oscillations due to marketing campaigns, yet it would combine the environmental impacts from all the variables in the simulation. The covariance matrix would be computed between the synthetic indices for the business segments.

Leveraging the decomposition provided by DtD, the present invention reformulates a steady-state portfolio—not variations in marketing. The portfolio can be created from the volume and credit quality of recent originations, or take a long term average of past marketing campaigns. Once the steady-state portfolio has been formulated, the past exogenous curves are replayed excluding seasonal effects to collect what the Net Default Loss Rate would have been.

One of the key advantages of this approach over a macroeconomic factor model is that it implicitly incorporates the response of management to macroeconomic cycles. A business that can cut EAD or LGD in response to a recession will see those actions reflected in their exogenous curves. In essence, the net effect of the economy and management's response are captured without requiring any explicit factors for those impacts. The assumption is that management will continue to perform no better and no worse then they have through the economic cycles captured in the historical data. That would seem to be the most appropriate assumption until management can prove their improved processes are effective in the next cycle.

Figure 6:
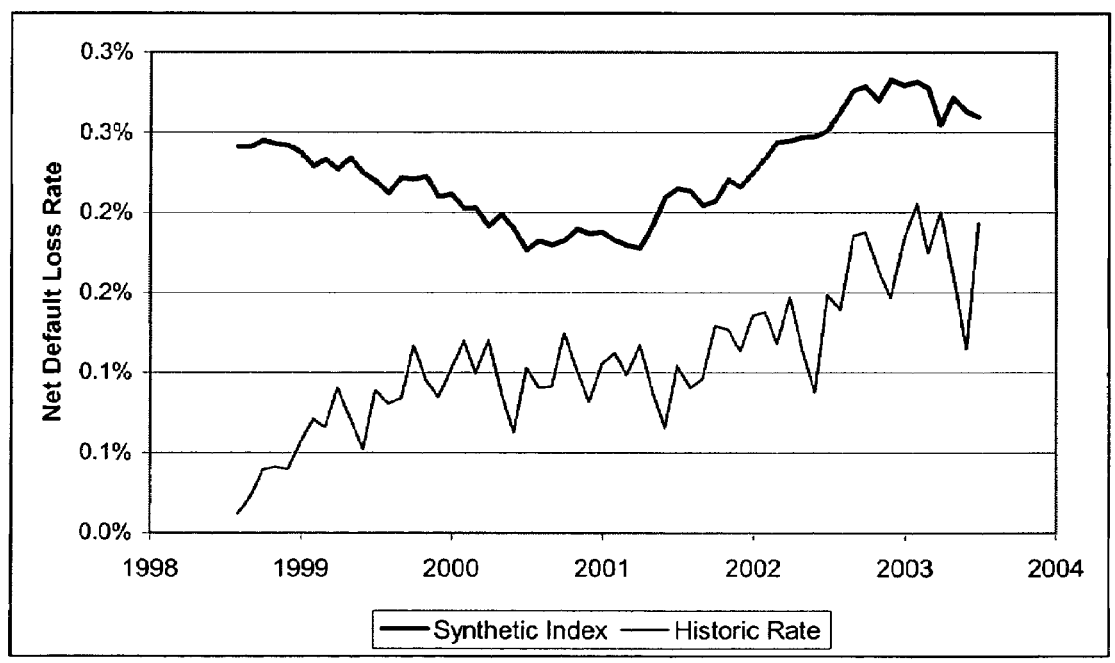
FIG. 6 is comparison of the original historical Net Default Loss Rate and the Synthetic Index for that rate created using the present invention to clean away pollution due to marketing and maturation effects. The Synthetic Index will provide much accurate correlation matrices and avoid false correlations due to the polluting trends.

The value of this approach is shown in FIG. 6, which shows the difference between a simple historical loss rate for a product launched in 1998 and a normalized curve which removes the impact of marketing during the product launch. The synthetic curve provides a more reliable correlation to other portfolios. As portfolio managers work to compute economic capital, they will continue to discover the inherent difficulties presented by retail loan behavior. The synthetic index approach provides a method for creating the metrics necessary to create optimized portfolios within retail lending and across asset classes. The synthetic indices avoid the problems of spurious correlations due to coincident marketing plans and lifecycle effects so that the true, underlying macroeconomic correlations can be revealed.

Correlations in Portfolio Optimization

The need to compute expected future product correlations is even more acute when considering portfolio optimization. The optimization formulas typically employed to achieve the ideal portfolio blend are metrics such as RoC (return on capital), RAROC (risk-adjusted return on capital) RORAC (return on risk-adjusted capital), and the Sharpe Ratio (return over volatility in return). All of these metrics have "return" in the numerator, which is return=revenue−expenses−losses, where expenses in the Sharpe Ratio would include cost of capital, but other metrics could define expenses and losses differently.

To compute the cross-product correlations, a synthetic index is required for the Return Rate incorporating the dynamics of all the underlying variables. Again, this is computed using a steady-state portfolio concept to expose just the macroeconomic impacts and management's response to those.

Figure 7:
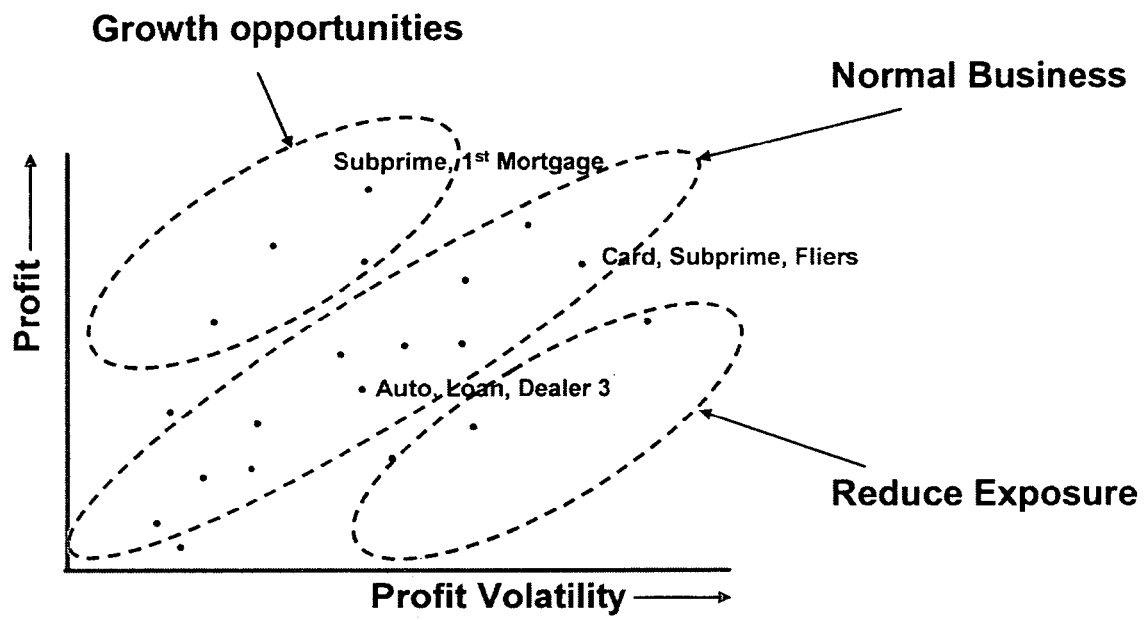
FIG. 7 is a diagram illustrating a plot of expected return (profit) versus volatility (profit volatility) for the three products illustrated in FIG. 6.

Simply plotting expected return (profit) versus volatility (profit volatility), as illustrated in FIG. 7, provides an initial view of which products are providing an acceptable trade-off between profit and volatility. Incorporating the expected product correlations will incorporate the concept that a diversified portfolio will perform better through the macroeconomic cycle. Some products may seem to perform poorly in isolation, but if they perform well when others are falling, the result is a more optimal portfolio. One study of bank stocks showed that a one-standard-deviation increase in volatility causes a 32% drop in market value.[1] Other studies have found similar relationships. The result will be a portfolio optimized to expected future revenue, expenses, losses, volatility, and covariance—all computed for today's portfolio without the noise of past actions.

[1] From "Earnings volatility, cash flow volatility, and firm value", Allayannis, Rountre, & Weston, December 2005.

Example for a Retail Portfolio

Retail portfolio optimization is useful in many business contexts. The most common area of application is in retail lending, which is defined as large pools of mostly homogenous accounts. Typical examples are credit cards, auto loans, mortgages, home equity loans and lines, personal loans and lines, and small business loans and lines. In this example, a hypothetical auto loan portfolio is considered with three segments: high credit risk, medium credit risk, and low credit risk.

Revenue and loss data is used as exemplary input data. For this data, two portfolio metrics are considered: net margin and net default losses. Net margin (profit) is the typical metric for portfolio optimization, as described in detail in: Principles of Corporate Finance, Fifth Edition", by Richard A. Brealey and Stewart C. Myers, McGraw-Hill, 1996, hereby incorporated by reference, and net default loss is used for computing economic capital, as described in detail in the Basel II literature, for example, "International Convergence of Capital Measurement and Capital Standards", by the Basel Committee on Banking Supervision, Bank for International Settlements Press & Communications, CH-4002, Switzerland, Copyright 2005, pages 1-284, hereby incorporated by reference. The key rates required to compute net default loss are:

Probability of Default, $PD(t)$=Defaults$(t)$/Active Accounts$(t-1)$

Exposure at Default, $EAD(t)$=Exposure$(t)$/Defaults$(t)$

Loss Given Default, $LGD(t)$=Net Default Loss$(t)$/Exposure$(t)$

Active Account Rate=Active Accounts$(t)$/Active Accounts$(t-1)$

These rates are computed on the historical data and decomposed into maturation, exogenous, and vintage quality via the process illustrated in FIG. 2. The exogenous curve was further decomposed into seasonality, trend, and events.

Figure 8:
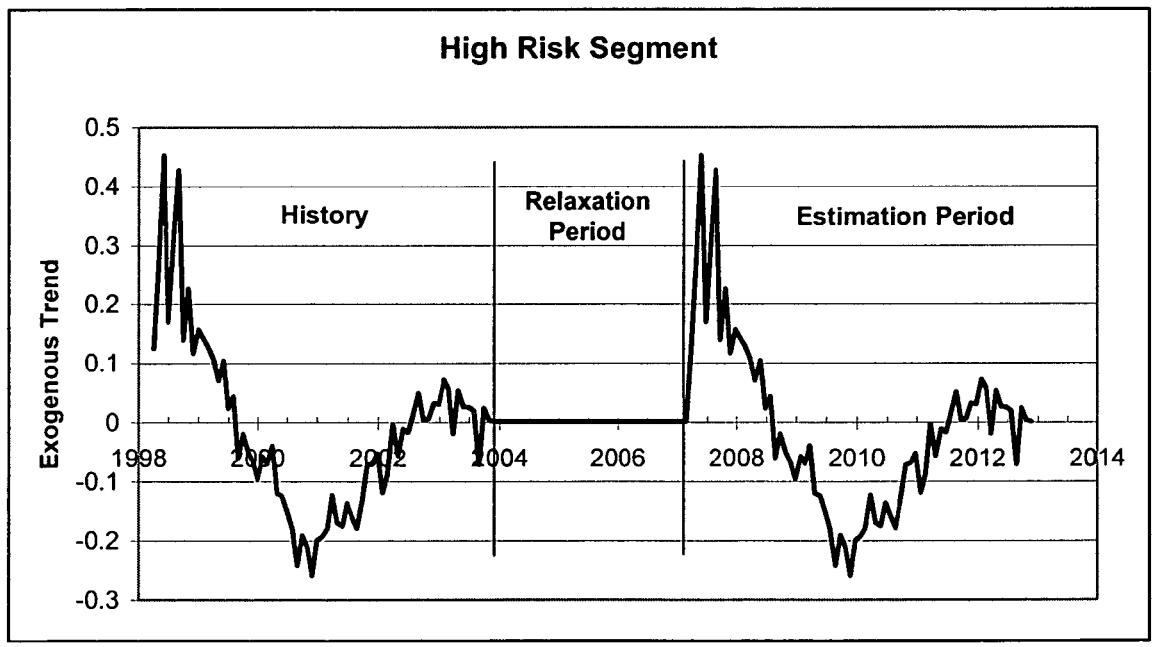
FIG. 8 is a diagram illustrating the exogenous trend for the probability of default (PD) for the High Risk Segment in a retail lending example. The historical region was obtained from performance data using the process of FIG. 2. The Relaxation Period uses a flat scenario. This is a delay in the forecast designed to allow the short term portfolio oscillations to dampen. The Estimation Period uses a scenario which is an exact replay of the History.
Figure 9:
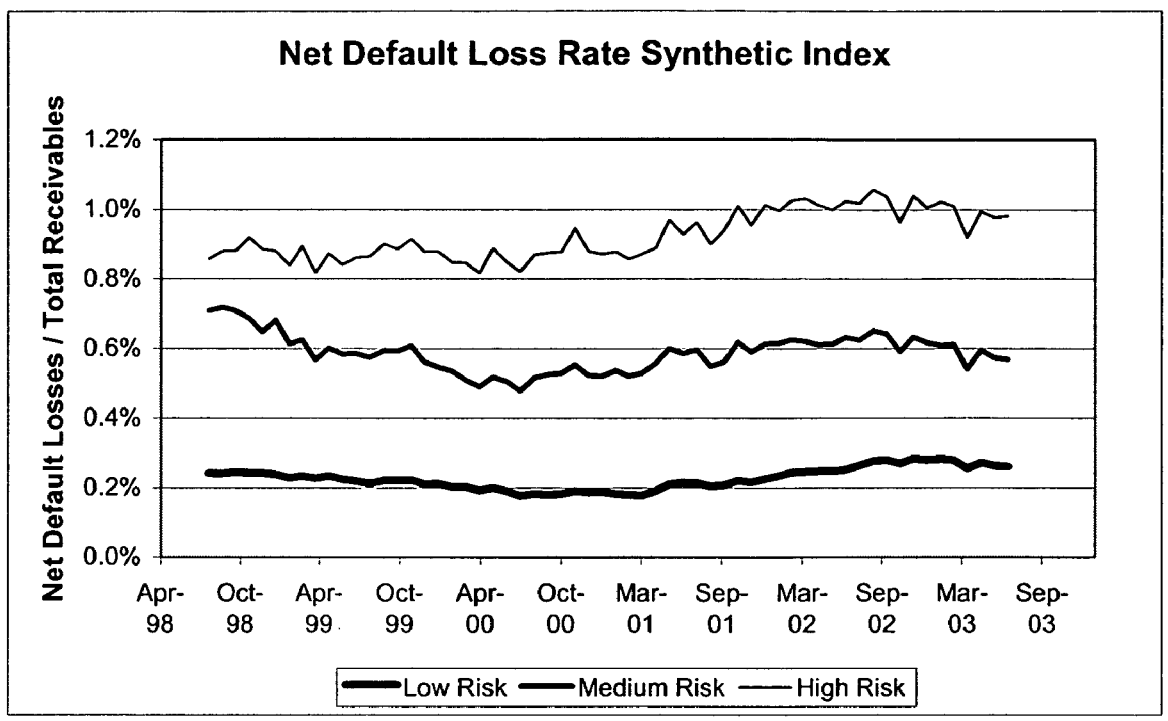
FIG. 9 is a plot of three synthetic indices for Net default Loss and the Synthetic Index for that rate created using the present invention to clean away pollution due to marketing and maturation effects. The synthetic index will provide relatively accurate correlation matrices and thereby avoid false correlations due to polluting trends.

A new bookings scenario is created as described above and seasonality is set to zero. FIG. 8 shows the historical exogenous trend for PD and the scenario created to comply with the previous description. A similar scenario is created for the exogenous trend scenarios of the other three rates: EAD, LGD, and Active Account Rate are forecast. Those forecasts are combined with the existing portfolio inventory to create portfolio forecasts via the following simulation equations:

Active Accounts$(t)$=Active Account Rate Forecast$(t)$*Active Accounts$(t-1)$

Defaults$(t)$=PD Forecast$(t)$*Active Accounts$(t-1)$

Exposure$(t)$=EAD Forecast$(t)$*Defaults$(t)$

Net Default Loss$(t)$=LGD Forecast$(t)$*Exposure$(t)$

The Estimation Period of the Net Default Loss forecast is extracted and shifted back to align with the historical period, creating the Synthetic Index for Net Default Loss. This process is followed for each of the three segments. The three indices are shown in FIG. 8.

FIG. 6 shows the need for the current invention. Standard approaches attempt to compute correlation matrices using the raw historical rate. The Synthetic Index illustrated in FIG. 6 shows how the historical rate is cleaned of marketing and maturation impacts to create a cleaned curve with oscillations only due the environment. The Synthetic Index provides much more accurate covariance calculations.

The following covariance matrix and corresponding correlation matrix for Net Default Loss can be computed between these products. The computation of covariance matrices is well known in the art. See, for example; "Statistical Models: Theory and Practice" by David A. Freeman, Cambridge University Press, 2005, hereby incorporated by reference.

|  | Low Risk | Medium Risk | High Risk |
|---|---|---|---|
| Covariance Matrix | | | |
| Low Risk | 3.5464E+12 | 4.8259E+12 | 4.5954E+12 |
| Medium Risk | 4.8259E+12 | 1.3092E+13 | 6.4645E+12 |
| High Risk | 4.5954E+12 | 6.4645E+12 | 1.1736E+13 |
| Correlation Matrix | | | |
| Low Risk | 1 | 0.708 | 0.712 |
| Medium Risk | 0.708 | 1 | 0.522 |
| High Risk | 0.712 | 0.522 | 1 |

Figure 4:
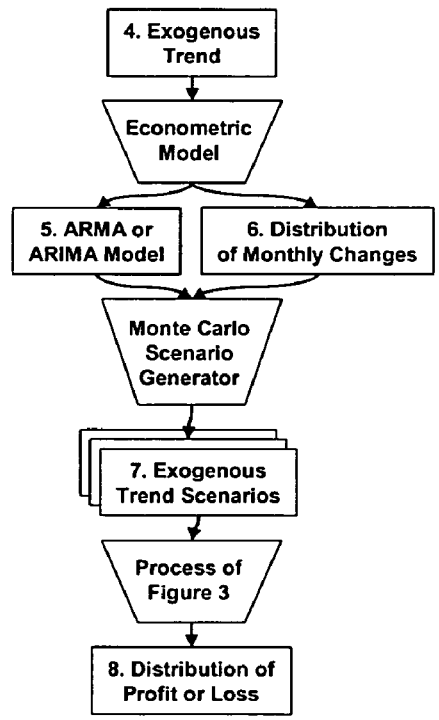
FIG. 4 is a diagram showing how a Monte Carlo scenario generator is calibrated on each of the exogenous trends in order to automatically generate a set of possible future scenarios for the exogenous trend. These scenarios are inserted into Item C of FIG. 3 in order to create a distribution of possible future accounts and balances for the portfolio. From these distributions, the volatility for any metric or the economic capital may be measured.

The processes in FIGS. 2 and 3 are used to predict the Net Default Loss and Profit Rate for the next year for each of these three segments. The process in FIG. 4 is used to compute the volatility in Net Default Loss and Profit Volatility for each of the three segments, for example as described in detail in U.S. patent application Ser. No. 10/359,895, filed on Feb. 7, 2003 and published as US Patent Application Publication No. US 2003/0225659 A1 on Dec. 4, 2003, entitled "Retail Lending Risk Related Scenario Generation", hereby incorporated by reference. These computations are also discussed in Principles of Corporate Finance, Fifth Edition", by Richard A. Brealey and Stewart C. Myers, McGraw-Hill, 1996 and "International Convergence of Capital Measurement and Capital Standards", by the Basel Committee on Banking Supervision, Bank for International Settlements Press & Communications, CH-4002, Switzerland, Copyright 2005, pages 1-294, both hereby incorporated by reference. Those values are shown in the following table.

|  | Expected Loss | Standard Deviation of Loss | Economic Capital | Profit Rate | Profit Volatility | Sharpe Ratio |
|---|---|---|---|---|---|---|
| Low Risk | $143,255,753 | $52,558,117 | $161,879,001 | 7.3% | 3.0% | 2.4 |
| Medium Risk | $341,647,834 | $107,596,883 | $331,398,399 | 9.2% | 1.8% | 5.1 |
| High Risk | $357,149,239 | $95,085,187 | $292,862,376 | 10.8% | 1.8% | 6.1 |

Combining this information with the covariance matrix shown above, the net economic capital required is $683,050,602. This falls between the worst case of $786,139,776 for a perfectly correlated portfolio and $470,954,436 for an uncorrelated portfolio, showing that the correlations have been taken into account when computing capital.

Economic capital was computed given the existing portfolio. To compute the ideal portfolio given these products, the estimated profit rate, profit volatility, and profit covariance matrices are inserted into a Markowitz Optimization algorithm, as described in detail in "Portfolio Selection", H. M. Markowitz, *Journal of Finance*, Vol. 7, Issue 1, pages 77-91, 1952, hereby incorporated by reference. The optimal weights are

| | |
|---|---|
| Low Risk | −16% |
| Medium Risk | 50% |
| High Risk | 66% |

The interpretation of this result is that if these were stocks in a stock market portfolio, the best performance would be obtained by short-selling the Low Risk segment. Since a retail loan portfolio can not be sold short, the implication is that the Low Risk segment is not beneficial to the overall portfolio and should be sold off. For business reasons, a small presence in Low Risk may be desirable, so the optimization can be rerun using a constraint on the minimum position allowed in any of these segments.

Obviously, many modifications and variations of the present invention are possible in light of the above teachings. Thus, it is to be understood that, within the scope of the appended claims, the invention may be practiced otherwise than as specifically described above.

What is claimed and desired to be secured by a Letters Patent of the United States is:

1. A computerized method for determining a performance metric for a loan portfolio having multiple types of loans to determine the effect of performance on one loan type on other loan types within the portfolio, the computerized method comprising the steps of:
    (a) storing loan performance data for said multiple types of loans on a computer readable medium;
    (b) reading said stored loan performance data from said computer readable medium and transforming said stored loan performance by way of a digital computer by decomposing said loan performance data into maturation, exogenous and vintage quality components under program control;
    (c) removing the effects of transient maturation and vintage quality components from the performance data for each loan type defining steady state performance data by way of said digital computer under program control; and
    (d) computing the covariance between different ones of said multiple types of loans based upon a performance metric using said steady state performance data by way of said digital computer under program control in order to evaluate said loan types in terms of portfolio optimization or economic capital calculation.

2. The computerized method as recited in claim 1, wherein said step (d) includes:
    (d) computing a loss rate using said steady state performance data by way of said digital computer under program control.

3. The computerized method as recited in claim 1, wherein step (d) includes:
    (d) computing profitability using said steady state performance data by way of said digital computer under program control.

4. The computerized method as recited in claim 2, wherein the capital required is determined based upon said loss rate by way of said digital computer under program control.

5. The computerized method as recited in claim 3, wherein said portfolio optimization is determined based upon said profitability by way of said digital computer under program control.

6. A digital computer system programmed to determine a performance metric for a loan portfolio having multiple types of loans to determine the effect of performance on one loan type on other loan types within the portfolio, comprising:
    a computer readable medium for storing loan performance data for said multiple types of loans;
    a digital computer for reading said loan performance data from said computer readable medium and transforming said loan performance data under program control by for decomposing the loan performance data into maturation, exogenous and vintage quality components;
    said digital computer programmed to remove the effects of transient maturation and vintage quality components from the performance data for each loan type defining steady state performance data; and
    said digital computer further programmed to compute a variance between different ones of said multiple types of loans based upon a performance metric using said steady state performance data in order to evaluate said loan types in terms of portfolio optimization or economic capital calculation.

7. The computer system as recited in claim 6, wherein said digital computer is programmed to compute the covariance for all of said loan types using said steady state data based upon a performance metric.

8. The digital computer system as recited in claim 6, wherein said performance metric is the loss rate.

9. The digital computer system as recited in claim 6, wherein said performance metric is profitability.

10. The digital computer system as recited in claim 8, wherein said digital computer is programmed to compute the capital required based upon said loss rate.

11. The digital computer system as recited in claim 9, wherein said digital computer is programmed to compute the portfolio optimization based upon said profitability.

12. The digital computer system as recited in claim 11, wherein said digital computer is programmed to compute an optimal loan portfolio based upon said portfolio optimization.

* * * * *